United States Patent [19]

Cardoos, Jr. et al.

[11] Patent Number: 4,941,000
[45] Date of Patent: Jul. 10, 1990

[54] DOWN LOADING FILM ACCESS DOOR ASSEMBLY FOR ELECTRONIC IMAGING APPARATUS

[75] Inventors: Nicholas Cardoos, Jr., Bedford; Stephen Decker, Sudbury; Philip R. Norris, North Reading; Lawrence Plummer, Needham, all of Mass.

[73] Assignee: Polaroid Corporation, Cambridge, Mass.

[21] Appl. No.: 421,082

[22] Filed: Oct. 13, 1989

[51] Int. Cl.$^5$ ...................... G01D 15/00; G11B 33/02
[52] U.S. Cl. ........................................ 346/145; 312/13
[58] Field of Search ............... 312/9, 13, 17; 346/145, 346/107

[56] References Cited

U.S. PATENT DOCUMENTS

| | | | |
|---|---|---|---|
| 334,834 | 1/1886 | Winter | 16/70 |
| 1,131,711 | 3/1915 | Kinard | 16/70 |
| 1,587,200 | 6/1926 | Sutcliffe | 312/17 |
| 1,963,687 | 6/1934 | Tappan | 16/66 |
| 2,666,944 | 1/1954 | Stehlin | 16/70 |
| 4,647,118 | 3/1987 | Kamperman | 312/13 |
| 4,800,400 | 1/1989 | Douglas | 346/107 R |

*Primary Examiner*—Donald A. Griffin
*Attorney, Agent, or Firm*—Edward S. Roman

[57] ABSTRACT

An electronic image printing apparatus is provided on the front face thereof with an improved downloading film access door assembly. The door assembly pivots substantially under the force of gravity from an upright closed position to an extended fully open position wherein a film cassette may be inserted into and/or withdrawn from a film cassette receiving carriage which is disposed for controlled reciprocal sliding translation during the printing process. A dashpot is provided for dampening the pivotal movement of the film loading access door so that it progressively decelerates as it approaches its open extended position so as to gradually come to a stop without substantial vibration or shock. The dashpot also includes a spring which extends through the back wall thereof to counter the increase in the weight induced opening torque as the door pivots downwardly.

There is also provided a latch assembly including a pivoting lever member which is cammed by the film access door assembly to latch the film cassette receiving carriage in its initial position when the door assembly is open to inhibit accidental movement of the carriage during film cassette insertion and/or withdrawal.

9 Claims, 5 Drawing Sheets

DOWN LOADING FILM ACCESS DOOR ASSEMBLY FOR ELECTRONIC IMAGING APPARATUS

BACKGROUND OF THE INVENTION

The present invention relates generally to improved features for electronic imaging apparatus of the type used for printing images on image recording material as the material is advanced along a preselected path in the apparatus.

An electronic image printing apparatus described in U.S. Pat. No. 4,800,400 entitled "Electronic Image printing Apparatus" by L. Douglas issued Jan. 24, 1989 discloses an electronic image printing apparatus which generates and prints images onto successive ones of a plurality of film units which are processed in the apparatus. The printing apparatus is housed in a generally parallelepiped structure having a top wall member. The film units used by the printing apparatus are of the self-developing type manufactured by Polaroid Corporation and comprise a plurality of stacked film units housed in a film cassette. The film cassette is inserted into the imaging apparatus by way of a door mounted on the top of the housing for slidable movement between open and closed positions. Whenever the door is open, it allows manual insertion and/or withdrawal of a film cassette. While this arrangement operates perfectly satisfactory, it does have the disadvantage in that the top of the imaging apparatus must be left accessible, thereby preventing the imaging apparatus from being placed between closely spaced shelves. Therefore it is desirable that the imaging apparatus be provided with a film cassette loading door on the front wall in order to eliminate the need to maintain a free and open space on top of the apparatus to accommodate film cassette loading and withdrawal.

It is a primary object of this invention to provide the electronic printing apparatus of the type described in the U.S. Pat. No. 4,800,400 Supra, with a front film cassette loading door that is moved from its closed to its open position by the force of gravity without incurring any material shock or vibration.

It is a further object of this invention to provide the electronic printing apparatus of the type described in U.S. Pat. No. 4,800,4000 supra with a front film cassette loading door wherein a film cassette maybe loaded into and/or withdrawn from a receiving carriage without risk of displacing the carriage from its initial film loading position.

Other objects of the invention will be in part obvious and will in part appear hereinafter. The invention accordingly comprises a mechanism and system possessing the construction, combination of elements and arrangement of parts which are exemplified in the following claims.

SUMMARY OF THE INVENTION

The invention relates to an improvement in an electronic image recording apparatus of the type comprising a housing and a film cassette receiving carriage disposed for controlled reciprocal sliding translation within the housing wherein the carriage is open at one end to accommodate sliding receipt therein and/or withdrawal therefrom of a film cassette in substantially the same direction that the carriage translates. The improvement comprises a film loading access door assembly with means for pivotally connecting the lower portion of the film loading access door assembly to the housing. The film loading access door assembly is weighted to pivot substantially under influence of the force of gravity from an upright closed position blocking receipt and/or withdrawal of the film cassette with respect to the carriage. Manual latching means are provided for latching the film loading access door. The latching means preferably comprises a latch member disposed for movement from a first position in latching engagement with the film loading access door assembly to maintain the film loading access door assembly in its upright closed position to a second position in unlatched relation with respect to the film loading access door assembly to accommodate its pivotal movement to the extended open position under the force of gravity.

Means are provided for dampening the pivotal movement of the film loading access door assembly such that the film loading access door assembly progressively decelerates as it approaches its open extended position so as to gradually come to a stop without substantial vibration or shock. The dampening means utilizes both a spring force and a controlled rate of airflow into a substantially evacuated and expanding chamber to gradually decelerate the film loading access door assembly. Preferably, the dampening means includes a dashpot comprising a cylindrical chamber having at least one end wall member with an aperture therethrough, and a plunger disposed for sliding translation within the cylindrical chamber. The plunger, in turn, includes an elongated portion extending outward of the end of the cylindrical chamber opposite to the end wall member. Means are provided for sealing the periphery of the plunger to the interior surface of the cylindrical chamber during translation of the plunger within the cylindrical chamber. The spring member is disposed within the cylindrical chamber between the plunger and the one end wall member with one end thereof connecting to the plunger and the other end thereof extending through the aperture in the one end wall member. The spring member and the aperture in the one end wall member are sized with respect to each other to define an annular orifice of select size to control the rate of airflow into the cylindrical chamber.

Latching means are also preferably displaceably mounted for movement between a first position in latching engagement with the carriage so as to inhibit the sliding translation of the carriage and a second position out of latching engagement with the carriage so as not to inhibit sliding translation of the carriage. The latching means also includes means operatively controlled by the film loading access door assembly to move the latching means into its first position when the film loading access door is moved to its extended open position and to move the latching means into its second position when the film loading access door is moved to its upright closed position. The latch means preferably comprises a lever pivotally connected with respect to the housing for movement between the first position in which a latch at one end of the lever engages the carriage and the second position in which the latch end of the lever disengages from the carriage. Means are provided for resiliently biasing the lever for movement from the second position to the first position. The film loading access door assembly includes means operatively connecting to the other end of the lever to move the lever from its first position to its second position against the force exerted by the resilient biasing means.

BRIEF DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein:

DESCRIPTION OF THE PREFERRED EMBODIMENTS

Figure 1:
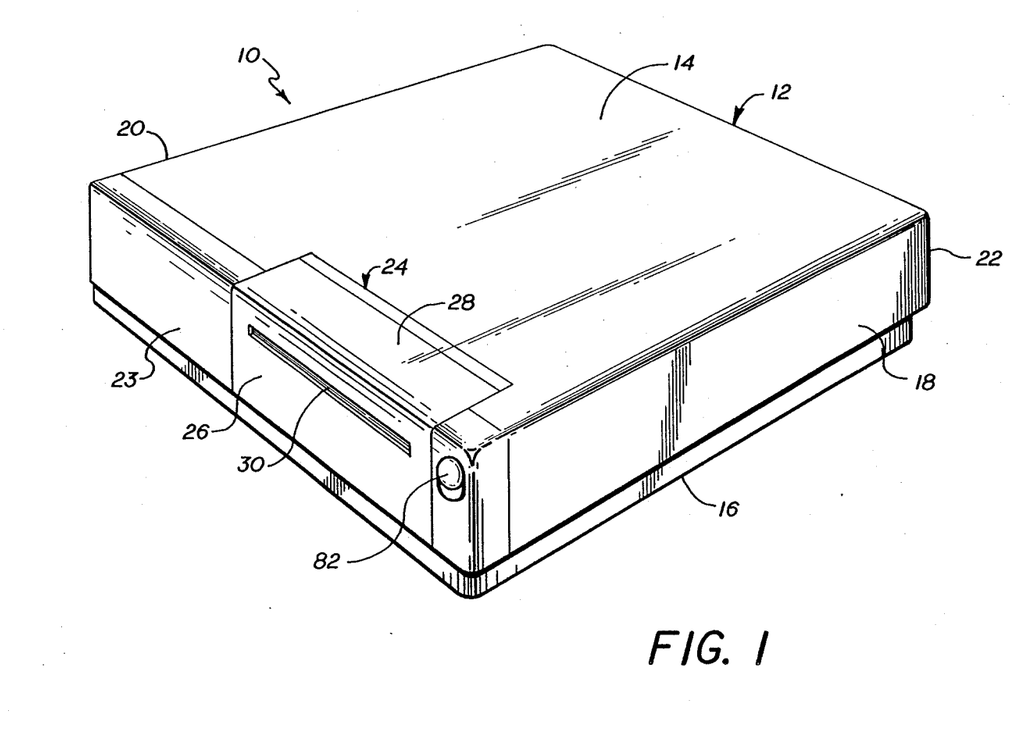
FIG. 1 is a perspective view of the electronic image recording apparatus of this invention.

Referring now to FIG. 1, there is shown at 10 the electronic image recording apparatus of this invention comprising a housing 12 of a generally parallelepiped structure. The parallelepiped structure comprises a substantially planar top wall member 14 spaced apart in generally parallel relation to a substantially planar bottom wall member 16. Interconnecting the top and bottom wall members, respectively, are opposed substantially parallel and planar vertical side wall members 18 and 20. The housing 12 also includes opposed substantially parallel and planar back and front wall members 22 and 23.

Figure 4:
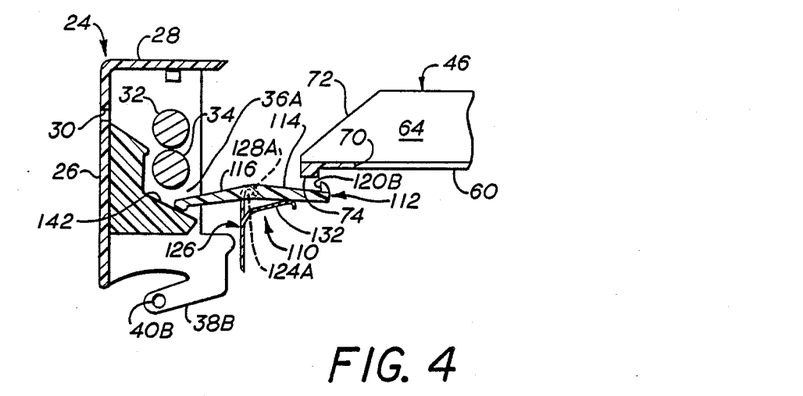
FIG. 4 is a partial cross-sectional side view taken along the line 4—4 of FIG. 3 showing selected portions of the electronic image recording apparatus of FIG. 1 in a first positional mode of operation.
Figure 6:
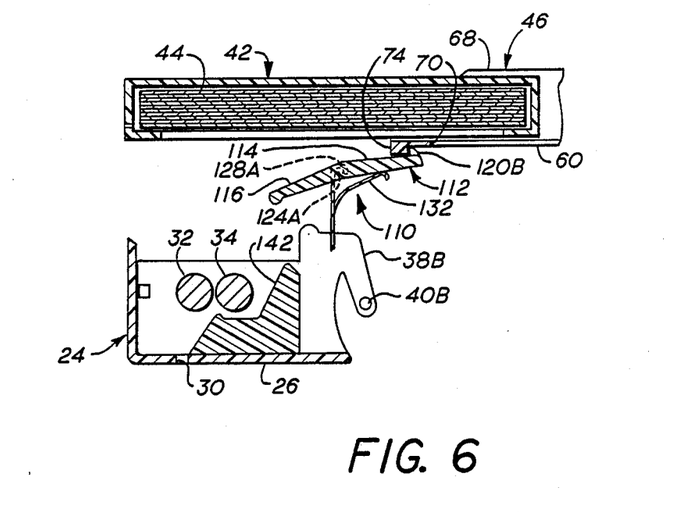
FIG. 6 is a partial cross-sectional view taken along the line 4—4 of FIG. 3 showing selected portions of the electronic image recording apparatus of FIG. 1 in still another positional mode of operation.

At the front of the housing 12, there is provided a front film loading door assembly 24 which may be pivoted from a closed upright position as shown in FIGS. 1 and 4 to an extended open position as shown in FIG. 6. The front door assembly 24 comprises a substantially planar front wall member 26 and a substantially planar top wall member 28. As is readily apparent from FIG. 1, when the front door assembly 24 is in the closed upright position, the surfaces of the front and top wall members 26 and 28 are substantially flush to the front and top wall members 23, and 14 respectively of the housing 12. In this manner, the front door assembly 24 is made to be substantially coextensive with the front and top of the housing 12. The front wall 26 of the front door assembly 24 includes an elongated film exit or discharge slot 30.

The front door assembly 24 also comprises opposed side wall members 36A and 36B between which are rotably disposed a pair of pressure applying spread rollers 32 and 34. The front door assembly 24 also comprises integral depending opposed pivot arm portions 38A and 38B having, respectively, pivot apertures 40A and 40B adjacent the ends thereof.

Movement of the front film loading door assembly 24 to its fully extended open position as shown in FIG. 6 operates to accommodate loading or withdrawal of the film cassette as shown at 42 (FIG. 6) with respect to the housing 12. The film cassette 42 preferably comprises a plurality of stacked film units 44 which are of the self-developing type such as that manufactured by Polaroid Corporation. Typically each of the film units includes an image forming area bordered by a frame and having a rupturable pod of processing fluid disposed along a leading marginal edge thereof as is well known in the art. Each of the film units 44 is adapted to be processed following exposure by the electronic image printing apparatus 10 of this invention by advancement through the pair of pressure applying spread rollers 32 and 34 which cause the processing fluid in the film unit to be spread between the positive and image receiving elements (not shown) of the units. This action operates to initiate the diffusion transfer process whereby latent images on the image forming area are developed. Exposure and advancement of the film units by the electronic image printing apparatus 10 is fully described in U.S. Pat. No. 4,800,400, entitled "Electronic Image Printing Apparatus", issued Jan. 24, 1989, and now fully incorporated herein by reference. Thus, only those elements related to understanding the operation of the present invention will be described in regard to the electronic image printing apparatus 10.

Figure 2:
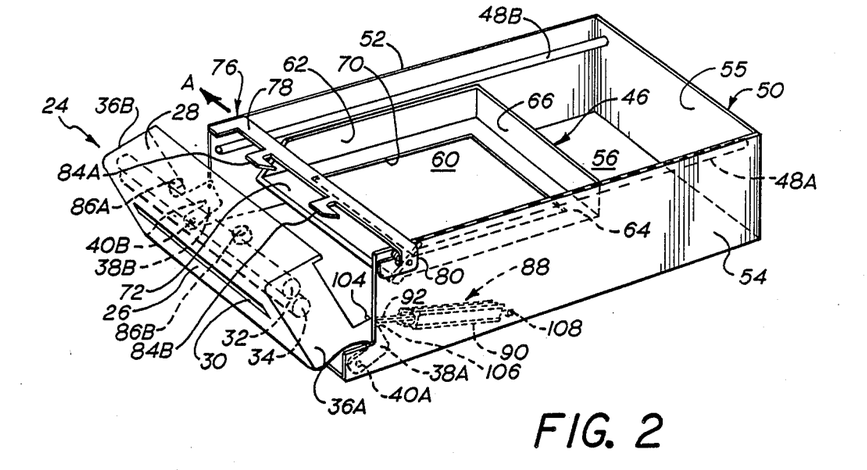
FIG. 2 is a perspective view showing other interior portions of the electronic image recording apparatus of FIG. 1.
Figure 3:
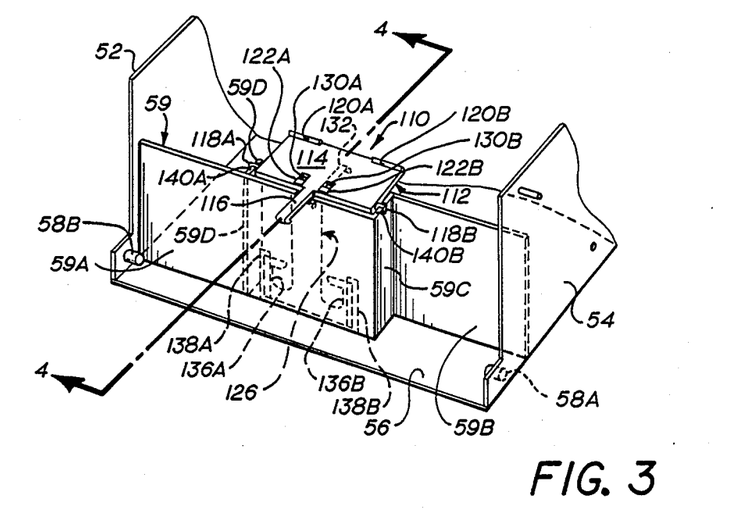
FIG. 3 is a cutaway perspective view showing other interior portions of the electronic image recording apparatus of FIG. 1.

Referring now to FIG. 2, there is shown an interior portion of the electronic image printing apparatus 10 comprising a film cassette carriage 46 mounted in the interior of the housing 12 so as to move reciprocally along a predetermined axial path defined by a pair of spaced apart parallel longitudinally extending guide rods 48A and 48B which are suitably supported by an interior housing assembly 50 comprising substantially parallel planar side wall members 52 and 54, a substantially planar back wall member 55 and an interconnecting substantially planar bottom wall member 56. Side wall members 52 and 54 include, respectively, laterally extending integral pivot pins 58A and 58B as best shown in FIG. 3 for connecting, respectively, to the pivot apertures 40A and 40B thereby retaining the front door assembly 24 for pivotal movement between its fully closed upright position as shown in FIG. 4 and its fully extended open position as shown in FIG. 6.

Interior housing assembly 50 also includes a front wall member 59 comprising sections 59A and 59B interconnected by right angle section 59C. An integral transverse wall section 59D also extends orthogonally from the wall section 59A in substantially parallel spaced apart relation with respect to the wall section 59C.

Figure 5:
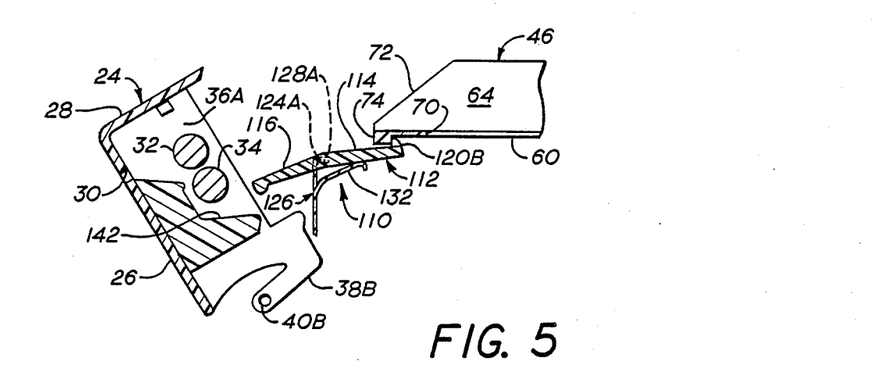
FIG. 5 is a partial cross-sectional view taken along the line 4—4 of FIG. 3 showing selected portions of the electronic image recording apparatus of FIG. 1 in another positional mode of operation.

The film cassette carriage 46 comprises a substantially planar bottom wall member 60. The bottom wall member connects to a pair of spaced apart opposed parallel substantially planar side wall members 62 and 64 and a substantially planar back wall member 66. The bottom wall member 68 includes a film exposure aperture 70 which aligns with the photosensitive area of the top film unit 44 of the film cassette 42 upon its insertion into the film cassette carriage 46 by way of an open end 72 of the film cassette carriage 46. The bottom wall member 60 of the film cassette carriage 46 includes an integral raised longitudinally extending edge portion 74 as best shown in FIGS. 4-6 which operates in the manner of this invention to be subsequently described. The film cassette carriage 46 is also preferably made of an opaque plastic or other suitable opaque lightweight material. The film cassette carriage 46 is mounted for reciprocal movement along the guide rods 48A and 48B in a manner as is fully described in U.S. Pat. No. 4,800,400, supra.

Referring back to FIG. 2, there is shown generally at 76 a door latch mechanism comprising a thin substantially flat cross bar member 78 disposed for reciprocal sliding movement in a direction orthogonal to the parallel side wall members 52 and 54. The cross bar member 76 may be stamped from sheet metal in a well known manner to preferably include a bent over tab portion 80 together with two spaced apart laterally extending integral hook or latch portions 84A and 84B. Translation of the cross bar member 78 in a direction as shown by arrow A may be manually initiated by actuating a button 82 on the housing 12 which, in turn, operates against the bent over tab portion 80 by an intervening mechanism (not shown). The planar cross bar member 78 is resiliently biased by means (not shown) to return to its original position as shown in FIG. 2 upon release of the button 82.

The top wall member 28 of the front door assembly 24 includes two spaced apart downwardly extending pin members 86A and 86B which, in turn, are engaged, respectively by the hook portions 84A and 84B to retain the door assembly 24 in its upright closed position. As will be now readily apparent, actuation of the button 82 operates to translate the cross bar member 78 and its associated latch portions 84A and 84B out of respective engagement with the integral pin members 86A and 86B so as to unlatch the front door assembly 24 thereby permitting its pivotal movement downwardly to the fully extended open position as shown in FIG. 6. The opening downward pivotal movement of the front door assembly 24 occurs substantially under the influence of the force of gravity without any external biasing forces being provided by springs or the like. The front door assembly 24, in turn, must be manually pivoted from its fully extended open position as shown in FIG. 6 back to its upright closed position as shown in FIG. 4. As is readily apparent, in order to latch the front door assembly 24, the pin members 86A, 86B operate, respectively, to engage the slanted leading edge portions of the hooks 84A, 84B so as to translate the cross bar member 78 in the direction of arrow A and thereby accommodate movement of the pins 86A, 86B into position so as to be engaged respectively by hooks 84A, 84B when the front door assembly 24 is moved into its full upright closed position.

Figure 7:
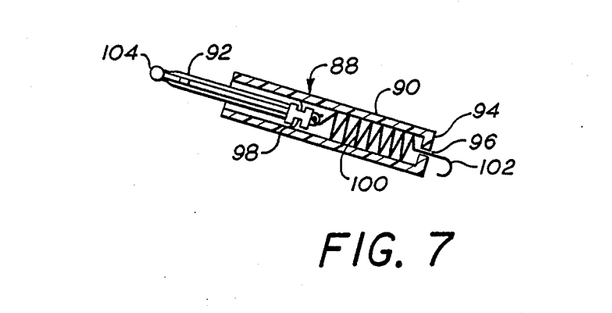
FIG. 7 is a cross-sectional view of the dashpot used in the electronic image recording apparatus of FIG. 1.

Since the opening movement of the front door assembly 24 is controlled substantially by the force of gravity, it is readily apparent that as the front door assembly 24 pivots downwardly toward its fully extended open position its movement will progressively accelerate until reaching its full/open extended position at which instant it will be abruptly stopped with such force as to result in a jarring potentially damaging shock to the front door assembly 24. In order to avoid the jarring potentially damaging abrupt stop of the front door assembly 24 when it reaches its fully extended open position as shown in FIG. 6, there is provided a dampening dashpot 88 as best shown in FIG. 7.

The dampening dashpot 88 comprises a cylindrical housing 90 having a wall 94 at one end thereof with an aperture 96 extending therethrough. A plunger 92 is disposed for reciprocal movement within the cylindrical housing 90 and includes an elastomeric seal 98 for forming a substantially airtight fit with the interior of the cylindrical housing 90. An extendable spring 100 connects at one end to the plunger 92 with the other end as shown at 102 extending through the aperture 96 in the end wall 94 to define a hooked portion as shown. The other end of the plunger 92 includes an integral pivot pin 104 extending transverse thereof for engagement with an aperture 106 formed in the pivot arm portion 38A. The other hooked end of the spring as shown at 102 connects to a pivot pin 108 extending laterally outward from the side wall 54.

The dashpot orifice is defined by the annular clearance between the spring 100 and the aperture 96 in the end wall 94 and is equivalent to an orifice in the order of 0.002. Since it is preferable that the cylindrical housing 90 be made of a suitably molded plastic, it would be extremely difficult to mold such a small orifice in the end wall 94 of the housing 90. Thus, in the manner of this invention a large aperture may be easily molded to accommodate spring insertion therethrough with a sufficient clearance to provide the same inlet airflow as would otherwise have to be provided by the critically sized small orifice.

The dashpot 88 thus operates to dampen the pivotal movement of the front door assembly 24 so that it progressively decelerates as it approaches its open extended position as shown in FIG. 6 thereby gradually coming to a stop without substantial vibration or shock. When the front door assembly 24 is in its closed position, the spring 100 is compressed so that upon unlatching of the door assembly, the spring 100 expands to initiate pivotal movement of the door assembly. The spring 100 thereafter expands and operates to counter the increase in the weight induced opening torque as the spread rollers 32 and 34 move laterally outward with respect to the axis of door pivot. Thus, the dashpot 88 utilizes both a spring force and a controlled inlet airflow to an expanding chamber to gradually decelerate the opening pivotal door movement.

Figure 8:
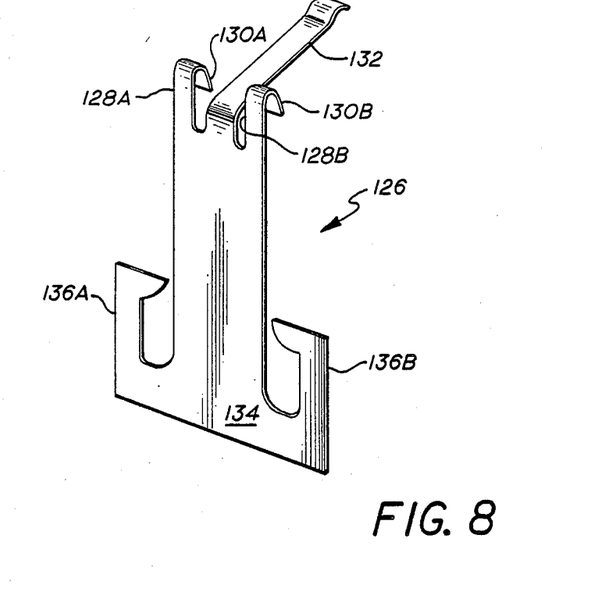
FIG. 8 is a perspective view of the bifurcated leaf spring member used in the electronic image recording apparatus of FIG. 1.
Figure 9:
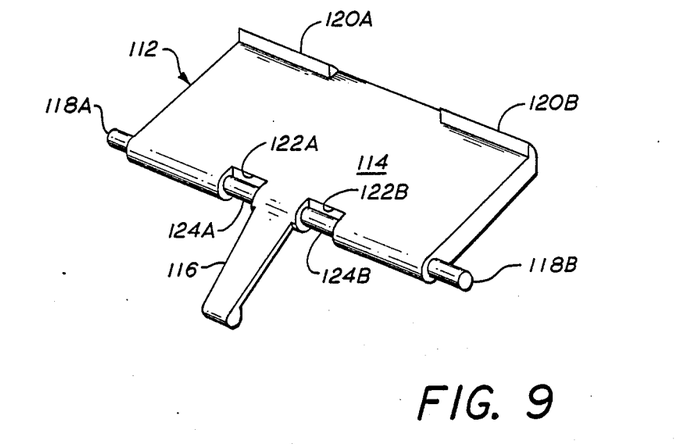
FIG. 9 is a perspective view of the lever latch member used in the electronic image recording apparatus of FIG. 1.

Referring now to FIG. 3 in conjunction with FIGS. 4-6, there is shown generally at 110 a latch assembly comprising a pivoting lever member 112 having a substantially flat planar portion 114 from which depends an elongated integral cam follower portion 116. The opposed edges of the planar portion 114 include integral laterally extending pivot pins 118A and 118B which are disposed, respectively, for pivotal movement in recessed journal sections 140A and 140B in wall sections 59D and 59C, respectively. The planar portion 114 also includes spaced apart raised integral latch portions 120A and 120B for engagement with the raised longitudinally extending edge portion 74 on the underlying side of the bottom wall member 60 of the film cassette carriage 46 in the manner of this invention to be subsequently described. The planar portion 114 also includes two spaced apart cutaway portions 122A and 122B in which integral pin members 124A and 124B extend, respectively, there across. A bifurcated leaf spring member as shown generally at 126 (FIG. 8) comprises two spaced apart arm sections 128A and 128B which terminate in respective curved end portions 130A, 130B. The leaf spring 126 also includes a major base portion 134 from which extend two resilient integral arm portions 136A and 136B. A resilient leaf spring arm portion 132 also extends laterally outward from between the two spaced apart arm portions 128A and 128B.

The leaf spring 126 is fixedly connected with respect to the front wall section 59A by insertion of the resilient arm portions 136A and 136B into respective complementary grooves or slots 138A, 138B integrally molded with respect to the wall section 59A. The curved end portions 130A, 130B engage respective integral pin members 124A, 124B so as to urge the pivot pins 118A, 118B into engagement with their complementary recessed journal sections 140A, 140B. The resilient leaf spring arm portion 132, in turn, engages the underside of the planar portion 114 so as to yieldably urge the lever member 112 to rotate in a counterclockwise direction 25 viewed from FIGS. 4-6 about the pivot pins 118A and 118B. The cam follower portion 116, in turn, engages an integrally molded cam surface 142 in the front door assembly 24.

Referring now to FIG. 4, it can be seen that when the front door assembly 24 is in its upright closed position, camming surface 142 engages the cam follower 116 so as to rotate the lever member 112 in a clockwise direction against the yieldable bias of leaf spring arm portion 132 thereby moving the raised integral latch portions 120A, 120B out of engagement with the raised longitudinal edge portion 74 extending downwardly from the bottom wall member 60 of the film cassette carriage 46. Thus, when the front door assembly 24 is in its upright closed position the film cassette carriage 46 is released for sliding translation along the guide rods 48A and 48B during image recording in the manner as fully described in U.S. Pat. No. 4,800,400, supra.

When the front door assembly 24 is unlatched by the manual actuation of button 82 so as to thereafter pivot to its fully extended open position as shown in FIG. 6, it can be seen that the cam surface 142 disengages from the cam follower 116 so as to permit counterclockwise rotation of the lever member 112 under the yieldable biasing force of the leaf spring arm portion 132 thereby rotating the integral latch portions 120A, 120B into engagement with the raised edge portion 74 on the underside of the bottom wall member 60 of the film cassette carriage 46. In this manner, the film cassette carriage 46 is latched into its initial position of travel along the guide rods 48A and 48B so as to permit insertion and/or removal of a film cassette 42 without risk of accidentally pushing the film cassette carriage 46 backward along the guide rods 48A and 48B as might happen if an edge of the film cassette 42 were to engage an edge of the open end of the film cassette carriage 46. Thus, in this manner is the film cassette carriage 46 latched into its forward initial position upon opening of the front door assembly 24 so as to permit easy insertion and/or withdrawal of film cassette from the film cassette carriage 46 without displacing the film cassette carriage 46 along the guide rods 48A, 48B.

Therefore, in accordance with this invention there is provided a front film loading door assembly for an electronic image film recorder of the type as is fully described in U.S. Pat. No. 4,800,400, supra, which may be unlatched and opened substantially under the influence of the force of gravity wherein the opening movement is gradually decelerated so as to come to a stop at a fully open extended position without incurring substantial shock or vibration. In addition, the opening movement of the front door assembly 24 also operates simultaneously to latch the film cassette carriage 46 in a manner whereby film cassettes may be inserted and/or withdrawn without risk of accidentally forcing the film cassette carriage 46 to move away from its initial start position.

Other embodiments of the invention, including additions, subtractions, deletions and other modifications of the preferred disclosed embodiment so modifications of the preferred disclosed embodiments of the invention will be obvious to those skilled in the art and are within the scope of the following claims.

What is claimed is:

1. In an electronic image recording apparatus of the type comprising a housing and a film cassette receiving carriage disposed for controlled reciprocal sliding translation therein, said carriage being open at one end thereof to accommodate sliding receipt therein and/or withdrawal therefrom of a film cassette in substantially the same direction that said carriage translates, the improvement comprising:

a film loading access door assembly;

means for pivotally connecting the lower portion of the film loading access door assembly to said housing, said film loading access door assembly being weighted to pivot substantially under the force of gravity from an upright closed position blocking receipt and/or withdrawal of the film cassette with respect to said carriage to an extended open position accommodating receipt and/or withdrawal of the film cassette with respect to said carriage;

manually actuable means for latching said film loading access door, said latch means comprising a latch member disposed for movement from a first position in latching engagement with said film loading access door assembly to maintain said film loading access door assembly in its said upright closed position to a second position in unlatched relation with respect to said film loading access door assembly to accommodate its pivotal movement to said extended open position under the force of gravity; and means for dampening the pivotal movement of said film loading access door assembly such that said film loading access door assembly progressively decelerates as it approaches its open extended position so as to gradually come to a stop without substantial vibration or shock wherein said dampening means utilizes both a spring force and a controlled rate of air flow into a substantially evacuated and expanding chamber to gradually decelerate said film loading access door assembly.

2. The improvement of claim 1 wherein said dampening means includes a dashpot comprising a cylindrical chamber having at least one end wall member with an aperture therethrough, a plunger disposed for sliding translation within said cylindrical chamber and including an elongated portion extending outward from the end of said cylindrical chamber opposite to said one end wall member, means for sealing the periphery of said plunger to the interior surface of said cylindrical chamber during translation of said plunger within said cylindrical chamber, and a spring member disposed within said cylindrical chamber between said plunger and said one end wall member with one end thereof connecting to said plunger and the other end thereof extending through said aperture in said one end wall member, said spring member and said aperture in said one end wall member being sized with respect to each other to define an annular orifice of select size to control the rate of airflow into said cylindrical chamber as said plunger is extracted from said cylindrical chamber.

3. The improvement of claim 2 wherein the end of said elongated portion of said plunger outside said cylindrical chamber is pivotally connected with respect to said film loading access door and the end of said spring member outside said cylindrical chamber is pivotally connected with respect to said housing.

4. The improvement of claim 2 wherein said film loading access door assembly comprises a major wall member having an elongated opening therethrough to accommodate the ejection of individual film units from the film cassette loaded into said carriage and a pair of juxtaposed rollers for advancing individual film units through said elongated opening, said rollers also being disposed on said film loading access door assembly to substantially contribute to said weighting thereof to assure opening movement solely under the force of gravity.

5. In an electronic image recording apparatus of the type comprising a housing and a film cassette receiving carriage disposed for controlled reciprocal sliding translation within said housing, said carriage being open at one end thereof to accommodate sliding receipt therein and/or withdrawal therefrom of a film cassette in substantially the same direction that said carriage translates, the improvement comprising:

a film loading access door assembly;

means for pivotally connecting the lower portion of the film loading access door assembly for movement from an upright closed position blocking receipt and/or withdrawal of the film cassette with respect to said carriage to an extended open position accommodating receipt and/or withdrawal of the film cassette with respect to said carriage;

manually actuable means for latching said film loading access door in said upright closed position;

latching means displaceably mounted for movement between a first position in latching engagement with said carriage so as to inhibit said sliding translation of said carriage and a second position out of latching engagement with said carriage so as not to inhibit said sliding translation of said carriage, said latching means also including means operatively controlled by said film loading access door assembly to move said latching means to its said first position when said film loading access door is moved to its said extended open position and to move said latching means to its said second position when said film loading access door is moved to its said upright closed position.

6. The improvement of claim 5 wherein said latch means comprises a lever pivotally connected with respect to said housing for movement between said first position in which one end of said lever engages said carriage and said second position in which said one end of said lever disengages from said carriage and, means for resiliently biasing said lever for movement for said second position to said first position and wherein said film loading access door assembly comprises means for operatively connecting to the other end of said lever to move said lever from its said first position to its said second position against the force exerted by said resilient biasing means.

7. The improvement of claim 6 wherein said one end of said lever which engages said carriage comprises an integral latch and the underside of said carriage comprises a raised edge portion for engagement by said integral latch.

8. The improvement of claim 6 wherein said means for operatively connecting to the other end of said lever comprises an integral cam surface.

9. The improvement of claim 6 wherein said lever comprises opposed laterally extending axially aligned integral pin members and said means for resiliently biasing said lever comprises a leaf spring member having one end stationed to yieldably engage said lever and the other end fixedly stationed with respect to said housing, said leaf spring member having two spaced apart bifurcated arm sections defining respective curved end portions for engaging said pin members respectively so as to maintain said pin members in fixed axial position with respect to said housing while enabling rotation of said lever about the axis of said pin members.

* * * * *